United States Patent
Kim et al.

(10) Patent No.: US 9,885,818 B2
(45) Date of Patent: Feb. 6, 2018

(54) BACKLIGHT UNIT INCLUDING LIGHT CONVERTING UNIT AND DISPLAY DEVICE HAVING THE SAME

(71) Applicant: Samsung Display Co., Ltd., Yongin-si, Gyeonggi-do (KR)

(72) Inventors: Jooyoung Kim, Suwon-si (KR); Luly Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 8 days.

(21) Appl. No.: 15/080,909

(22) Filed: Mar. 25, 2016

(65) Prior Publication Data

US 2016/0341877 A1    Nov. 24, 2016

(30) Foreign Application Priority Data

May 18, 2015  (KR) .......................... 10-2015-0068895

(51) Int. Cl.
*F21V 7/04* (2006.01)
*F21V 8/00* (2006.01)

(52) U.S. Cl.
CPC ......... *G02B 6/0026* (2013.01); *G02B 6/0088* (2013.01); *G02B 6/0091* (2013.01)

(58) Field of Classification Search
CPC ... G02B 6/0026; G02B 6/0088; G02B 6/0091
USPC ........................................ 362/608, 610, 615
See application file for complete search history.

(56) References Cited

U.S. PATENT DOCUMENTS

| | | |
|---|---|---|
| 2013/0114299 A1 | 5/2013 | Lee et al. |
| 2014/0091275 A1 | 4/2014 | Coe-Sullivan et al. |
| 2014/0160789 A1 | 6/2014 | Park |
| 2014/0185271 A1 | 7/2014 | Hyun |
| 2014/0211448 A1 | 7/2014 | Wang |
| 2014/0254131 A1 | 9/2014 | Osinski et al. |
| 2014/0275544 A1 | 9/2014 | McDaniel et al. |

FOREIGN PATENT DOCUMENTS

| | | |
|---|---|---|
| KR | 1020120007292 A | 1/2012 |
| KR | 1020130009021 A | 1/2013 |
| KR | 1020130010966 A | 1/2013 |

*Primary Examiner* — Vip Patel
(74) *Attorney, Agent, or Firm* — Cantor Colburn LLP

(57) ABSTRACT

A display device includes: a display panel which displays an image with light; a light source which generates and emits the light; a light guide plate which receives the light emitted from the light source on a first surface of the light guide plate and emits the received light through a second surface of the light guide plate different from the first surface; and a light converting unit between the light source and the light guide plate. The light converting unit includes: a phosphor which converts a first color of the light emitted from the light source to a second color different from the first color; a transparent base in which the phosphor is disposed; and a transparent film between the light source and the phosphor disposed in the transparent base, the transparent film being attached to a surface of the transparent base.

14 Claims, 3 Drawing Sheets

BACKLIGHT UNIT INCLUDING LIGHT CONVERTING UNIT AND DISPLAY DEVICE HAVING THE SAME

This application claims priority to Korean Patent Application No. 10-2015-0068895, filed on May 18, 2015, and all the benefits accruing therefrom under 35 U.S.C. §119, the disclosure of which is incorporated herein in its entirety by reference.

BACKGROUND

1. Field

Exemplary embodiments of the invention relate to a display device, and more particularly, to a display device which reduces or effectively prevents leakage of blue light and provides a narrow bezel.

2. Description of the Related Art

A liquid crystal display ("LCD") device is a type of flat panel display ("FPD") device which has gained wide acceptance. An LCD device includes two display substrates having electrodes disposed therein and a liquid crystal layer interposed between the two display substrates. In such an LCD device, orientations of liquid crystal molecules of the liquid crystal layer are rearranged by voltages that are applied to the electrodes, thereby adjusting the amount of light transmitted through the liquid crystal layer such that an image is displayed by the LCD device. Because an LCD panel included in an LCD device is a non-emissive element, an LCD device is provided with a backlight unit which generates and provides light to the LCD panel. Such backlight units are classified into types including edge-type backlight units and direct-type backlight units based on a position of a light source within the backlight assembly. The edge-type backlight unit has a structure in which light sources are disposed at a side surface of a light guide plate.

A light emitting diode ("LED") light source, having advantages such as relatively low-power consumption and high efficiency, is widely used as a light source. LED light sources emit blue light, and white light is provided from the emitted blue light via a color-converting material such as a phosphor. Accordingly, the blue light emitted from the LED light source is subsequently converted into white light to provide a full color through a color filter of an LCD panel. Thus, research into enhancing the color reproducibility of blue light is gaining attention.

SUMMARY

One or more exemplary embodiment of the invention is directed to a display device which reduces or effectively prevents leakage of blue light at an edge of the display device and has a narrow bezel.

According to an exemplary embodiment of the invention, a display device includes: a display panel which displays an image with light: a light source which generates and emits the light; a light guide plate which receives the light emitted from the light source on a first surface of the light guide plate and emits the received light through a second surface of the light guide plate different from the first surface; and a light converting unit between the light source and the light guide plate. The light converting unit includes: a phosphor which converts a first color of the light emitted from the light source to a second color different from the first color; a transparent base in which the phosphor is disposed; and a transparent film between the light source and the phosphor disposed in the transparent base, the transparent film being attached to a surface of the transparent base.

In a direction from the light source to the transparent base in which the phosphor is disposed, a thickness of the transparent film may be smaller than a thickness of the transparent base.

The transparent film may include one or more of the following: polyethylene terephthalate ("PET"), acryl, polycarbonate ("PC"), urethane acrylate, polyester, epoxy acrylate and brominate acrylate.

The phosphor may include a quantum dot particle.

A groove may be defined in the surface of the transparent base.

The phosphor may be disposed in the groove defined in the surface of the transparent base to which the transparent film is attached.

The display device may further include: a lower frame on which the light source and the light guide plate are disposed; and a mold portion which is coupled to the lower frame and fixes therein the light converting unit including the transparent film between the light source and the phosphor disposed in the transparent base.

An aperture may be defined in the mold portion in a direction in which the light is emitted from the light source.

According to another exemplary embodiment of the invention, a display device includes: a display panel which displays an image with light: a light source which generates and emits the light; a light guide plate which receives the light emitted from the light source on a first surface of the light guide plate and emits the received light through a second surface of the light guide plate different from the first surface; and a light converting unit between the light source and the light guide plate. The light converting unit includes: a phosphor which converts a first color of the light emitted from the light source to a second color different from the first color; a transparent base in which the phosphor is disposed; and a transparent sealing portion between the light source and the phosphor disposed in the transparent base, the transparent sealing portion being attached to a surface of the transparent base. In a direction from the light source to the transparent base in which the phosphor is disposed, a thickness of the transparent sealing portion is smaller than a thickness of the transparent base.

The phosphor may include a quantum dot particle.

A groove may be defined in the surface of the transparent base to which the transparent film is attached.

The phosphor may be disposed in the groove defined in the surface of the transparent base.

The display device may further include: a lower frame on which the light source and the light guide plate are disposed; and a mold portion which is coupled to the lower frame and fixes therein the light converting unit including the transparent film between the light source and the phosphor disposed in the transparent base.

An aperture may be defined in the mold portion in a direction in which the light is emitted from the light source.

The foregoing is illustrative only and is not intended to be in any way limiting. In addition to the illustrative embodiments, and features described above, further embodiments, and features will become apparent by reference to the drawings and the following detailed description.

BRIEF DESCRIPTION OF THE DRAWINGS

The above and other features of the present disclosure of invention will be more clearly understood from the following detailed description taken in conjunction with the accompanying drawings, in which.

DETAILED DESCRIPTION

Figure 1:
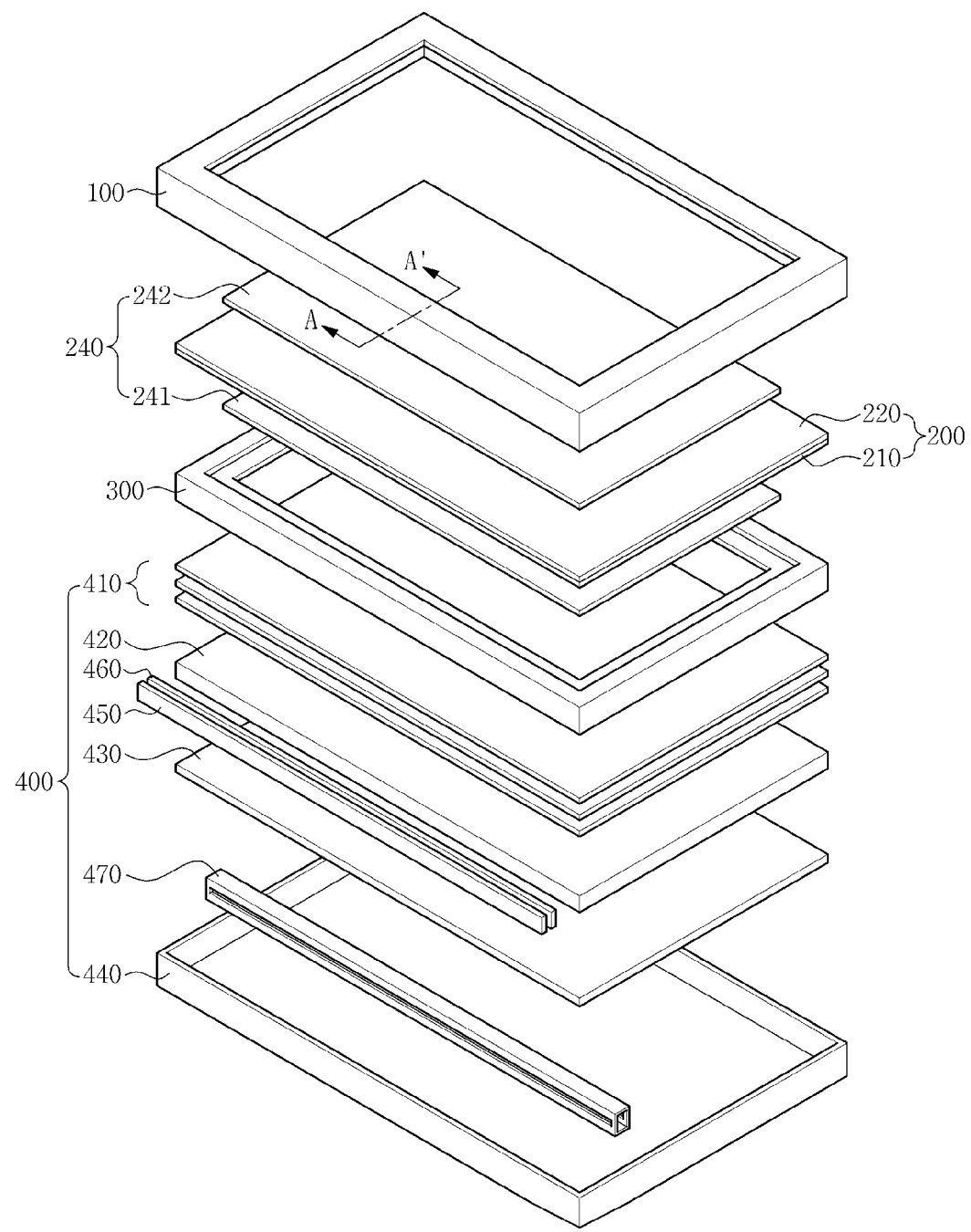
FIG. 1 is a schematic exploded perspective view illustrating an exemplary embodiment of a display device according to the invention.

Advantages and features of the invention and methods for achieving them will be made clear from exemplary embodiments described below in detail with reference to the accompanying drawings. The invention may, however, be embodied in many different forms and should not be construed as being limited to the exemplary embodiments set forth herein. Rather, these exemplary embodiments are provided so that this disclosure will be thorough and complete, and will fully convey the scope of the invention to those skilled in the art. The invention is merely defined by the scope of the claims. Therefore, well-known constituent elements, operations and techniques are not described in detail in the exemplary embodiments in order to prevent the invention from being obscurely interpreted. Like reference numerals refer to like elements throughout the specification.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The spatially relative terms "below," "beneath," "lower," "above," "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

All terminologies used herein are merely used to describe the exemplary embodiments and may be modified according to the relevant art and the intention of an applicant. Therefore, the terms used herein should be interpreted as having a meaning that is consistent with their meanings in the context of the present disclosure, and is not intended to limit. As used herein, the singular forms "a," "an," and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein (including technical and scientific terms) have the same meaning as commonly understood by those skilled in the art. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Within a backlight unit, a scheme of providing white light having excellent color reproducibility by inserting a quantum dot tube between a blue light emitting diode ("LED") light source and a light guide plate has been suggested. However, in an attempt to reduce costs, a quantum dot disk has emerged as an alternative to the quantum dot tube.

Where a quantum dot disk is applied in an edge-type backlight unit within a display device, due to a thickness of a glass material forming the quantum dot disk, an overall thickness of a bezel of the display device increases and a blue light is leaked to be incident on a display panel of the display device. The blue light incident on the display panel may cause degradation of the color reproducibility of the display device.

Hereinafter, an exemplary embodiment of a display device will be described with reference to FIGS. 1 through 3B.

Figure 2:
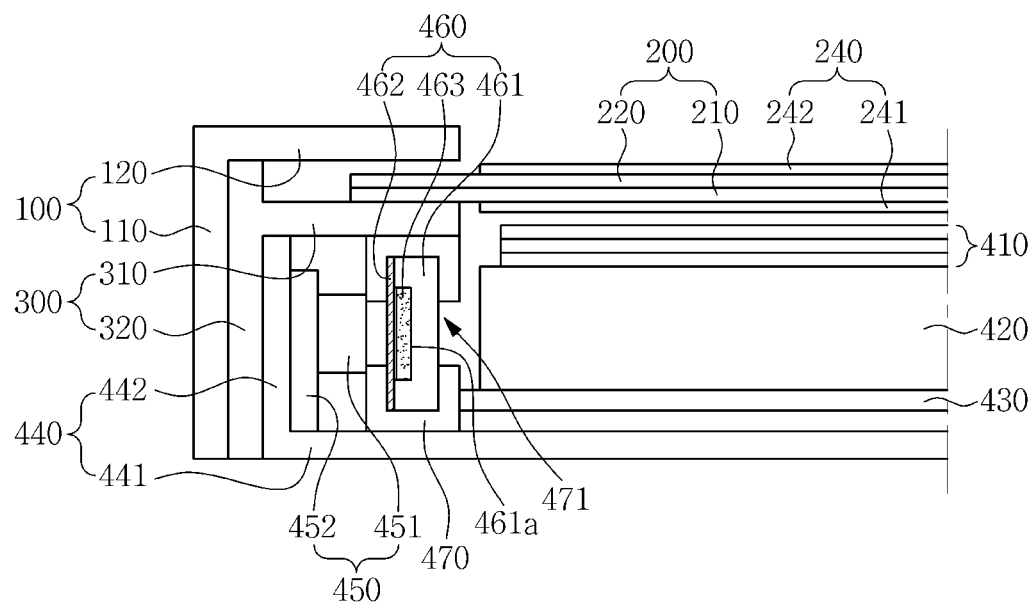
FIG. 2 is a cross-sectional view taken along line A-A' of FIG. 1.

FIG. 1 is a schematic exploded perspective view illustrating an exemplary embodiment of a display device according to the invention. FIG. 2 is a cross-sectional view taken along line A-A' of FIG. 1.

Referring to FIGS. 1 and 2, the display device includes a display panel 200 which displays an image by using light, a backlight assembly 400 which generates and provides the light to the display panel 200, an upper frame 100 which surrounds the display panel 200, and an intermediate frame 300 on which the display panel 200 is mounted.

The upper frame 100 is coupled to a lower frame 440 so as to cover an edge of the display panel 200 which is mounted on the intermediate frame 300. The upper frame 100 includes an edge portion 110 coupled to the lower frame 440, and a protruding portion 120 which is bent from the edge portion 110 to extend therefrom. The upper frame 100 may define both the side surface portion 110 and the protruding portion 120. One of the side surface portion 110 and the protruding portion 120 may extend to define the other one of the side surface portion 110 and the protruding portion 120.

The edge of the display panel 200 covered by the upper frame 100 is a non-display area of the display device. In a top plan view of the display device, the non-display area may define a bezel of the display device. The upper frame 100 has an opening defined therein at a center portion thereof and through which the display panel 200 is exposed.

The upper frame 100 may be coupled to the lower frame 440 through a coupling member such as including hook coupling and/or screw coupling. In addition, the coupling of the upper frame 100 and the lower frame 440 may be modified in various manners. In an exemplary embodiment, the upper frame 100 may be omitted based on the type of display device.

The display panel 200 is configured to display images. The display panel 200 as a light-receiving type (or non-emissive-type) display panel may include a liquid crystal display ("LCD") panel, an electrowetting display panel, an electrophoretic display ("EPD") panel, a microelectromechanical system ("MEMS") display panel, and the like. In the exemplary embodiment, an LCD panel is described as the display panel 200 by way of example.

The display panel 200 may be provided in a quadrangular planar shape having two pairs of parallel sides. According to the exemplary embodiment, the display panel 200 may have a rectangular shape having a pair of relatively long sides and a pair of relatively short sides. The display panel 200 includes a first display substrate 210, a second display substrate 220 opposing the first display substrate 210, and a liquid crystal layer (not illustrated) between the first and second display substrates 210 and 220. The display panel 200, when viewed in a plane (e.g., such as in a front/top plan view), has a display area in which an image is displayed and the non-display area that surrounds the display area and in which an image is not displayed. The non-display area is covered by the upper frame 100.

The first display substrate 210 may include a plurality of pixel electrodes (not illustrated) and a plurality of thin film transistors (not illustrated) which is electrically connected to the pixel electrodes in one-to-one correspondence, on a first base substrate. The thin film transistor includes a source electrode connected to a data line, includes a gate electrode connected to a gate line, and includes a drain electrode connected to the pixel electrode. Each thin film transistor functions as a switch of a driving signal supplied to a corresponding pixel electrode.

Further, the second display substrate 220 may include a common electrode (not illustrated) forming an electric field which controls an arrangement of liquid crystals, along with the pixel electrodes, on a second base substrate. The display panel 200 is configured to drive the liquid crystal layer to display an image frontwards.

The display device includes a driving chip (not illustrated) configured to supply a driving signal to the display panel 200, a driving-chip mounting film (not illustrated) on which the driving chip is mounted, and a printed circuit board ("PCB", not illustrated) electrically connected to the display panel 200 through the driving-chip mounting film. The driving-chip mounting film may be a tape carrier package ("TCP").

The driving chip generates a driving signal for driving the display panel 200 in response to an external signal. The external signal is supplied from the PCB and may include an image signal, various control signals, a driving voltage and the like.

A polarizer 240 (or polarizing member) is disposed on the display panel 200, and collectively includes a first polarizer 241 and a second polarizer 242. The first and second polarizers 241 and 242 are disposed on respective opposing surfaces of the first and second display substrates 210 and 220. In other words, the first polarizer 241 may be attached onto an outer side of the first display substrate 210, and the second polarizer 242 may be attached onto an outer side of the second display substrate 220. A transmissive axis of the first polarizer 241 is substantially at a right angle with respect to a transmissive axis of the second polarizer 242.

The intermediate frame 300 is coupled to the lower frame 440 and accommodates the display panel 200 therein. The intermediate frame 300 may include a flexible material, such as plastic, in order to reduce or effectively prevent damage to the display panel 200.

The intermediate frame 300 is provided along an edge of the display panel 200 and supports the display panel 200 thereon from therebelow. Among the sides of the display panel 200, the intermediate frame 300 may be provided to correspond to each of the four sides or at least one of the four sides of the display panel 200. In the top plan view, for example, the intermediate frame 300 may have a quadrilateral-loop shape corresponding to each of the four sides of the display panel 200, or may have a "[" shape, that is, a quadrilateral open-loop shape corresponding to three of the four sides of the display panel 200.

The intermediate frame 300 collectively includes a support 310 on which the display panel 200 is disposed and a side wall portion 320 which is bent from an end of the support 310. The intermediate from 300 may define the support 310 thereof and the side wall portion 320 thereof. One of the support 310 and the side wall portion 320 may be extended to define the other one of the support 310 and the side wall portion 320.

The support 310 is disposed extended along an edge of the display panel 200 so as to support the display panel 200 thereon. The side wall portion 320 may be coupled to a side surface portion 442 of the lower frame 440 such as through a hook coupling and/or a screw coupling.

The backlight assembly 400 includes an optical sheet 410, a light guide plate 420, a reflective sheet 430, the lower frame 440, a light source unit 450 and a light converting unit 460.

The light source unit 450 includes a light source 451 which generates light and a circuit board 452 on which the light source 451 is disposed. The light source unit 450 may be disposed at an edge or a light incident side surface of the light guide plate 420. In other words, the light source unit 450 may emit light toward the edge or the light incident side surface of the light guide plate 420.

The light source 451 may include at least an LED chip (not illustrated) and a package (not illustrated) which accommodates the LED chip. The light source 451 may have a light dissipating (e.g., emitting) surface in a direction in which the light guide plate 420 is disposed. Light emitted from the light source 451 may be blue light.

The circuit board 452 includes, for example, a PCB or a metal printed circuit board ("MPCB").

The light source unit 450 may be provided at one side surface, two side surfaces or four side surfaces of the light guide plate 420, based on a size, luminance uniformity and the like, of the display panel 200. According to exemplary embodiments, the light source unit 450 may be disposed adjacent to at least one of the edges of the light guide plate 420.

The light guide plate 420 receives a light emitted from the light source 451 and the received light is incident on the light incident side surface of the light guide plate 420. The light guide plate 420 thereby guide the incident light to emit the guided light toward and through a light emitting surface of the light guide plate 420. The light guide plate 420 is configured to uniformly supply the light supplied from the light source unit 450 to the display panel 200. The light guide plate 420 is disposed adjacent to the light source unit 450 and is accommodated in the lower frame 440.

The light guide plate 420 may be provided, for example, in a quadrangular planar shape, similarly to the display panel 200, but the shape of the light guide plate 420 is not limited thereto. According to exemplary embodiments, where an LED is used as the light source 451, the light guide plate 420 may have various shapes such as including defined therein, a predetermined groove and/or a protrusion based on a position of the light source 451.

The light guide plate 420 is described herein as having a planar shape, that is, a plate, for ease of description. While the light guide plate 420 is described as a plate, such as having a relatively large cross-sectional thickness for ease of description, the invention is not limited thereto. According to exemplary embodiments, the light guide plate 420 may be provided in a sheet or film shape for which the cross-sectional thickness is smaller than that of the plate and is relatively small as compared to the planar size thereof, to achieve slimness of the display device. The light guide plate 420 is to be understood as having a concept that includes not only a plate but also a film which guides light provided from the light source unit 450.

The light guide plate 420 may include a light-transmissive material. The light-transmissive material may include polycarbonate ("PC"), or an acrylic resin such as polymethyl methacrylate ("PMMA") to help guide light efficiently.

A pattern may be disposed on at least a surface of the light guide plate 420. In an exemplary embodiment, for example, a scattering pattern (not illustrated) may be disposed to allow light guided to a lower surface of the light guide plate 420 to be emitted upwardly therein.

The optical sheet 410 is disposed on the light guide plate 420 and serves to diffuse and/or collimate light transmitted from the light guide plate 420. The optical sheet 410 may collectively include a diffusion sheet, a prism sheet, a protective sheet and the like.

The diffusion sheet may serve to disperse light incident thereon from the light guide plate 420 to thereby reduce or effectively prevent a partial concentration of light.

The prism sheet may include, at a surface thereof, prisms having a triangular cross-section and provided in a predetermined array. The prism sheet may be disposed on the diffusion sheet to collimate light diffused from the diffusion sheet in a direction perpendicular to the display panel 200.

The protective sheet may be disposed on the prism sheet, may protect a surface of the prism sheet, and may diffuse light in order to achieve uniform light distribution.

The reflective sheet 430 is disposed between the light guide plate 420 and the lower frame 440, and reflects a light emitted downwardly of the light guide plate 420 to allow the light to be re-directed toward the display panel 200, thereby improving light efficiency.

The reflective sheet 430 may include, for example, polyethylene terephthalate ("PET"), thus having reflectivity. A surface of the reflective sheet 430 may include or be coated with a diffusion layer containing, for example, titanium dioxide ($TiO_2$).

According to exemplary embodiments, the reflective sheet 430 may include or be formed of a material containing a metal, such as silver (Ag).

The lower frame 440 accommodates the reflective sheet 430 and the light guide plate 420 therein. The lower frame 440 includes a bottom portion 441, and the side surface portion 442 which is bent from the bottom portion 441. The lower frame 440 may define the bottom portion 441 thereof and the side wall portion 442 thereof. One of the bottom portion 441 and the side wall portion 442 may extend to define the other of the bottom portion 441 and the side wall portion 442. The bottom portion 441 of the lower frame 440 is parallel to the light guide plate 420. The lower frame 440 may include, for example, a metal material having rigidity, such as stainless steel, or a material having excellent heat dissipation properties, such as aluminum (Al) or an Al alloy. The lower frame 440 maintains an overall framework of the display device and protects various components of the display device accommodated therein.

The light converting unit 460 is provided in the backlight assembly 400 in order to provide white light having high color reproducibility.

The light converting unit 460 may be disposed between the light source 451 and the light guide plate 420, and may convert a color of light supplied from the light source 451. In an exemplary embodiment, for example, when a blue light is emitted from the light source 451, the blue light may be converted into a white light by subsequently passing through the light converting unit 460.

The light converting unit 460 includes a transparent base 461, a transparent film 462 and a phosphor 463.

The transparent base 461 may include or be formed of a light-transmissive transparent material, for example, glass. In addition, the transparent base 461 may include a transparent electrode material having relatively high thermal conductivity, such as sapphire, zinc oxide or magnesium oxide.

The transparent base 461 may have a groove 461a defined in a surface thereof that faces the transparent film 462.

The transparent film 462 is disposed between the light source 451 and the transparent base 461, and is attached to a surface of the transparent base 461. In a direction from the light source 451 to the light guide plate 420 (e.g., horizontal in FIG. 2), the transparent film 462 has a thickness smaller than a thickness of the transparent base 461.

The transparent film 462 may include one or more of the following: polyethylene terephthalate ("PET"), acryl, polycarbonate ("PC"), urethane acrylate, polyester, epoxy acrylate and brominate acrylate. However, the material forming the transparent film 462 is not limited thereto.

The phosphor 463 is disposed between the transparent base 461 and the transparent film 462. The phosphor 463 includes a particle of a quantum dot. The phosphor 463 is disposed in the groove 461a defined in the transparent base 461.

The quantum dot (not illustrated) may have a spherical shape having a diameter in a range of about a few nanometers to tens or hundreds of nanometers. In addition, a quantum dot, which is a nanomaterial, may include a core including or formed of a small band gap material, a shell surrounding the core and including or formed of a wide band gap material, and a ligand attached to the shell.

Such a nano-sized quantum dot may exhibit a quantum confinement effect in which a wide band gap is observed and the band gap has a discontinuous band gap structure which is similar to a structure of a single individual atom unlike a crystal I in a bulk form. In the quantum dot, gaps in the discontinuous band gap structure may be adjusted based on a size of the quantum dot. Thus, when the quantum dot is synthesized to have a uniform size distribution, a light converting structure having a small full width at half maximum ("FWHM") may be obtained. In detail, because light having a longer wavelength may be generated as the size of the quantum dot increases, a wavelength of light to be emitted may be adjusted by adjusting the size of the quantum dot.

The quantum dot absorbs a light emitted from the light source 451, and emits a light having a wavelength corresponding to a band gap of the quantum dot.

In detail, when the light emitted from the light source 451 is referred to as a first light, and the light emitted from the quantum dot is referred to as a second light, a wavelength of the first light is shorter than or equal to a wavelength of the second light. Therefore, based on the above-described characteristics of energy law, the quantum dot may not emit a light having greater energy than that of the absorbed light. Accordingly, the wavelength of the second light is longer than or equal to that of the first light.

Examples of the quantum dot may include a Group II-VI compound such as ZnS, ZnSe, ZnTe, CdS, CdSe, CdTe, HgS, HgSe and HgTe, a Group III-V compound such as PbS, PbSe, PbTe, AlN, AlP, AlAs, AlSb, GaN, GaAs, GaSb, InN, InP, InAs, and InSb, or the like.

Where the light source 451 is a blue LED, the light converting unit 460 may collectively include at least one type of a first quantum dot configured to emit green light and a second quantum dot configured to emit red light. The second quantum dot has a diameter greater than that of the first quantum dot.

The first quantum dot configured to emit green light may include, for example, a manganese-doped zinc silicon oxide-based phosphor (for example, $Zn_2SiO_4:Mn$), an europium-doped strontium gallium sulfide-based phosphor (for example, $SrGa_2S_4:Eu$), or an europium-doped barium silicon oxide chloride-based phosphor (for example, $Ba_5Si_2O_7Cl_4:Eu$).

The second quantum dot configured to emit red light may include, for example, a praseodymium-doped or aluminum-doped strontium titanium oxide-based phosphor (for example, $SrTiO_3:Pr,Al$) or a praseodymium-doped calcium titanium oxide-based phosphor (for example, $CaTiO_3:Pr$).

Where the light converting unit 460 collectively includes the first and second quantum dots, light emitted from the light converting unit 460 may be white light in which red light, green light and blue light are combined.

The display device according further includes a mold portion 470 coupled to the lower frame 440 and fixing the light converting unit 460. The mold portion 470 has an aperture 471 defined therein in a direction in which light is emitted from the light source 451, that is, a light emitting direction of the light converting unit 460. According to exemplary embodiments, the mold portion 470 may be omitted, and the light converting unit 460 may be fixed to the lower frame 440 or to the intermediate frame 300.

The effects of the light converting unit 460 which is disposed in the above-described manner will be described in greater detail hereinbelow with reference to FIGS. 3A and 3B.

Figure 3A:
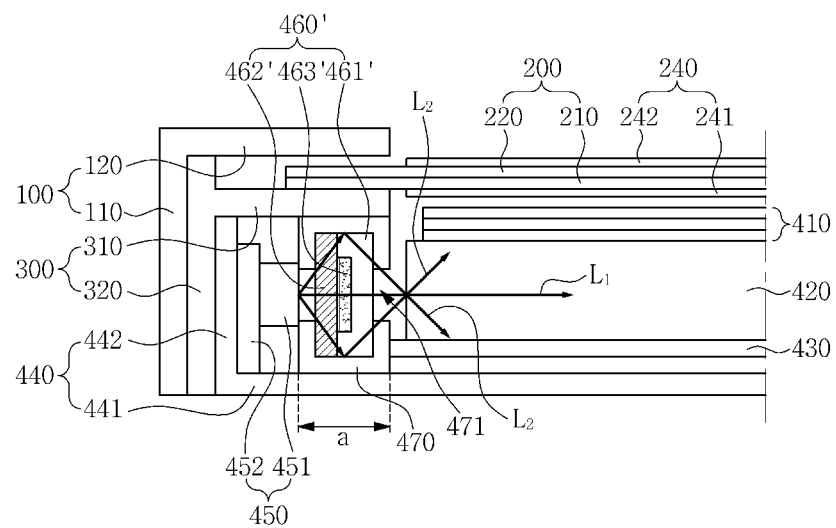
FIG. 3A is a schematic cross-sectional view illustrating blue light leaked from a conventional display device.

Referring to FIG. 3A, a conventional light converting unit 460' includes a transparent glass 462' coupled to a transparent base 461'. In a direction in which light is emitted from the light source 451, the transparent glass 462' has a predetermined thickness so as to seal a phosphor 463', and is coupled to the transparent base 461'. Accordingly, a light transmitted through the light converting unit 460' includes a light L1 that is transmitted through the phosphor 463' and a light L2 that is not transmitted through the phosphor 463' due to the thickness of the transparent glass 462'. The light L2 that is not transmitted through the phosphor 463' is defined by a light which is incident on the light converting unit 460' at an initial angle and is not converted into white light by the phosphor 463', and such light L2 may cause an issue of blue light leakage. The light traveling at the initial angle to be incident on the light converting unit 460 may not be incident on the phosphor 463' owing to the thickness of the transparent glass 462' positioning the phosphor 463' outside of the initial angle. In addition, in a thickness direction of the transparent glass 462', a dimension (e.g., thickness) of a bezel of a display device may be undesirably increased.

Figure 3B:
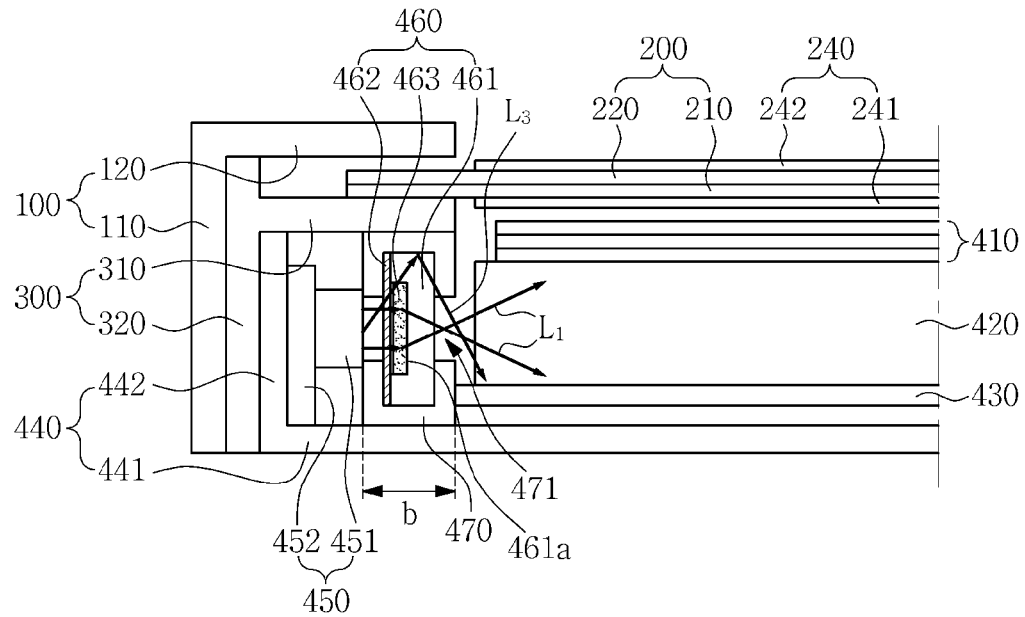
FIG. 3B is a schematic cross-sectional view illustrating an exemplary embodiment of a light-converting unit in the display device of FIG. 1.

Referring to FIG. 3B, in one or more exemplary embodiment of a display device, the transparent film 462 having a relatively small thickness is used in lieu of the transparent glass 462' of the conventional light converting unit 460'. The transparent film 462 having a relatively small thickness allows a light which is incident on the light converting unit 460 at an initial angle to be transmitted through the phosphor 463. In other words, a light L3 incident on the light converting unit 460 at an angle similar to the initial angle described with respect to FIG. 3A may be transmitted through the phosphor 463 to be converted into white light. As illustrated in FIG. 3B, the light traveling at the initial angle to be incident on the light converting unit 460 may be incident on the phosphor 463 owing to the reduced thickness of the transparent glass 462 positioning the phosphor 463 within the initial angle. Accordingly, in one or more exemplary embodiment, blue light leakage may be reduced or effectively prevented. Further, because a thickness "b" of the light converting unit 460 and the mold portion 470 of FIG. 3B is smaller than a thickness "a" of the conventional light converting unit 460' and the mold portion 470 of FIG. 3A, a narrow bezel may be provided for the display device.

Hereinafter, another exemplary embodiment of a display device will be described with reference to FIG. 4. Descriptions of components of the display device in FIG. 4 that are the same as those of the display device in FIGS. 1, 2 and 3A will be omitted herein for conciseness.

Figure 4:
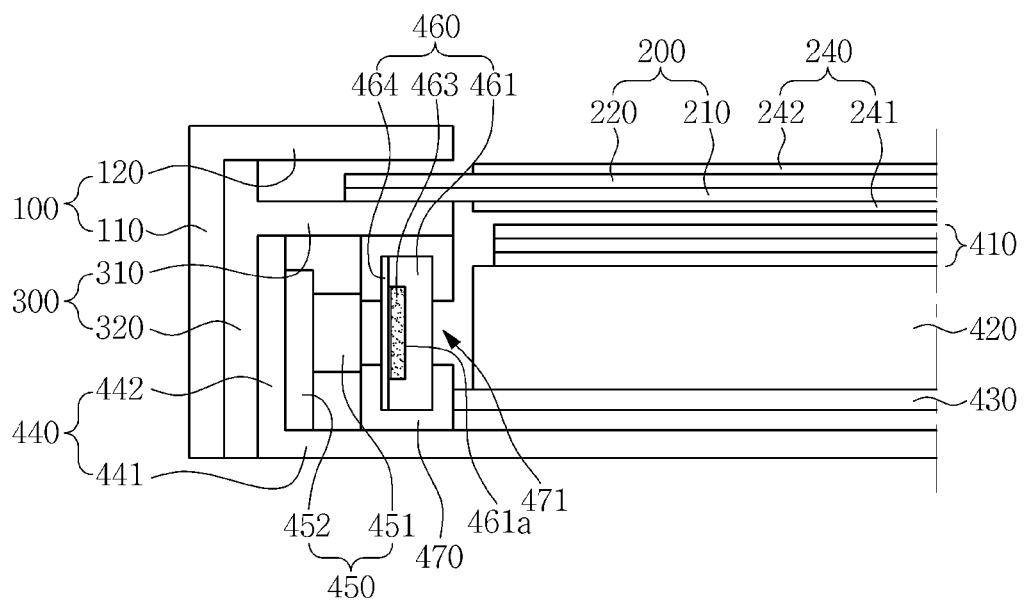
FIG. 4 is a schematic cross-sectional view illustrating another exemplary embodiment of a display device according to the invention.

FIG. 4 is a schematic cross-sectional view illustrating another exemplary embodiment of a display device according to the invention.

Referring to FIG. 4, a light converting unit 460 includes a transparent sealing portion 464 in lieu of the transparent film 462 illustrated in FIG. 2. The transparent sealing portion 464 includes or is formed of the same material which forms a conventional transparent glass, and has a thickness smaller than that of the transparent base 461. Accordingly, the light converting unit 460 illustrated in FIG. 4 may have the same effects as those described with respect to the light converting unit 460 illustrated in FIG. 2.

As set forth above, according to one or more exemplary embodiment, the display device may convert substantially an entirety of blue light incident on the light converting unit into white light, may enhance the color reproducibility thereof, and may provide a narrow bezel.

From the foregoing, it will be appreciated that various exemplary embodiments in accordance with the present disclosure have been described herein for purposes of illustration, and that various modifications may be made without departing from the scope and spirit of the present teachings. Accordingly, the various exemplary embodiments disclosed herein are not intended to be limiting of the true scope and spirit of the present teachings. Various features of the above described and other embodiments can be mixed and matched in any manner, to produce further embodiments consistent with the invention.

What is claimed is:

1. A display device comprising:
    a display panel which displays an image with light:
    a light source which generates light and emits the light;
    a light guide plate which receives the light emitted from the light source on a first surface of the light guide plate, and emits the received light through a second surface of the light guide plate different from the first surface; and
    a light converting unit between the light source and the light guide plate,
    wherein the light converting unit comprises:
        a phosphor which converts a first color of the light emitted from the light source to a second color different from the first color;
        a transparent base in which the phosphor is disposed; and
        a transparent film between the light source and the phosphor disposed in the transparent base, the transparent film attached to a surface of the transparent base, and
        wherein
        a bottom of the phosphor is a surface thereof facing the transparent base,
        a bottom of the transparent base is a surface thereof facing the light guide plate, and
        a thickness of the transparent film in a direction from the light source to the transparent base is smaller than a distance from the bottom of the phosphor to the bottom of the transparent base.

2. The display device of claim 1, wherein in the direction from the light source to the transparent base in which the phosphor is disposed, the thickness of the transparent film is smaller than a thickness of the transparent base.

3. The display device of claim 2, wherein the transparent film comprises one or more of polyethylene terephthalate, acryl, polycarbonate, urethane acrylate, polyester, epoxy acrylate and brominate acrylate.

4. The display device of claim 1, wherein the phosphor comprises a quantum dot particle.

5. The display device of claim 1, wherein a groove of the transparent base is recessed from the surface of the transparent base to which the transparent film is attached.

6. The display device of claim 5, wherein the phosphor is disposed in the groove defined recessed from the surface of the transparent base.

7. The display device of claim 1, further comprising:
    a lower frame on which the light source and the light guide plate are disposed; and
    a mold portion which is coupled to the lower frame and fixes therein the light converting unit comprising the transparent film between the light source and the phosphor disposed in the transparent base.

8. The display device of claim 7, wherein an aperture is defined in the mold portion in a direction in which the light is emitted from the light source.

9. A display device comprising:
    a display panel which displays an image with light:
    a light source which generate light and emits the light;
    a light guide plate which receives the light emitted from the light source on a first surface of the light guide plate, and emits the received light through a second surface of the light guide plate different from the first surface; and
    a light converting unit between the light source and the light guide plate,
    wherein the light converting unit comprises:
        a phosphor which converts a first color of the light emitted from the light source to a second color different from the first color;
        a transparent base in which the phosphor is disposed; and
        a transparent sealing portion between the light source and the phosphor disposed in the transparent base, the transparent sealing portion attached to a surface of the transparent base, and
        wherein
        a bottom of the phosphor is a surface thereof facing the transparent base,
        a bottom of the transparent base is a surface thereof facing the light guide plate, and
        in a direction from the light source to the transparent base in which the phosphor is disposed,
            a thickness of the transparent sealing portion is smaller than a thickness of the transparent base, and
            a thickness of the transparent film is smaller than a distance from the bottom of the phosphor to the bottom of the transparent base.

10. The display device of claim 9, wherein the phosphor comprises a quantum dot particle.

11. The display device of claim 9, wherein a groove of the transparent base is defined recessed from the surface of the transparent base to which the transparent sealing portion is attached.

12. The display device of claim 11, wherein the phosphor is disposed in the groove defined recessed from the surface of the transparent base.

13. The display device of claim 9, further comprising:
    a lower frame on which the light source and the light guide plate are disposed; and
    a mold portion which is coupled to the lower frame and fixes therein the light converting unit comprising the transparent sealing portion between the light source and the phosphor disposed in the transparent base.

14. The display device of claim 13, wherein an aperture is defined in the mold portion in a direction in which the light is emitted from the light source.

* * * * *